G. G. Kniffin,
Sad Iron,
N° 54,174. Patented Apr. 24, 1866.
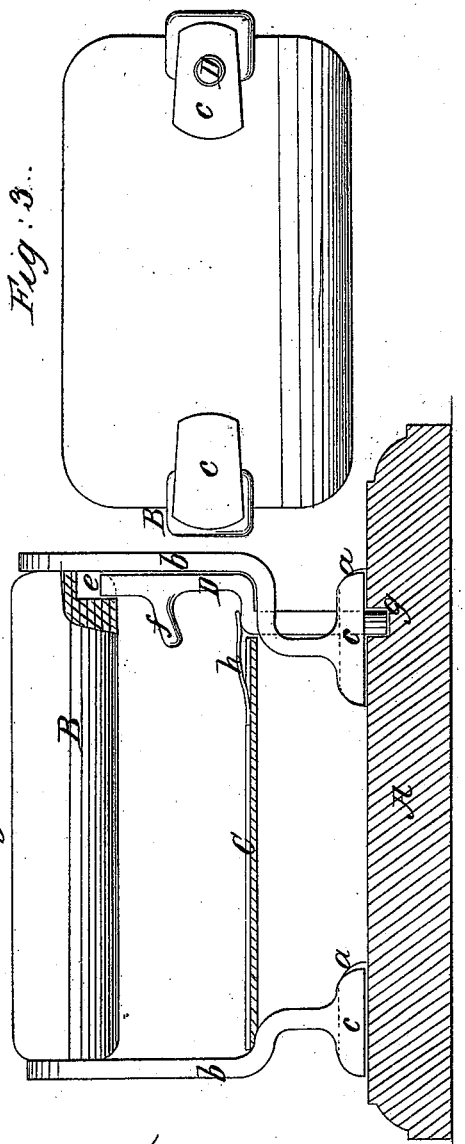
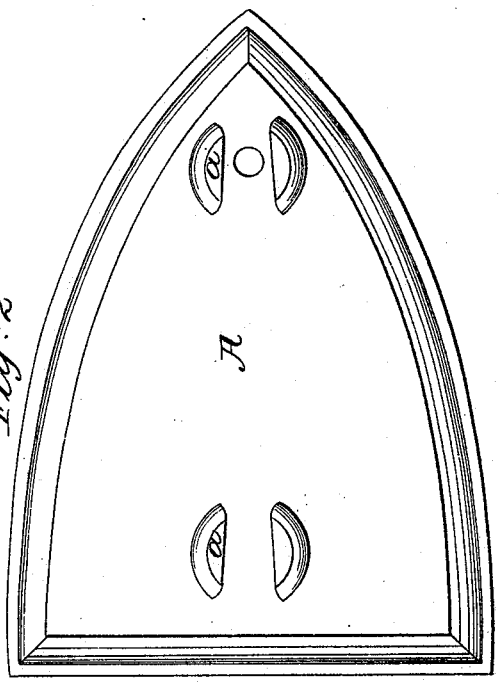
Witnesses,
Inventor,
G. G. Kniffin
Per Munn & Co
Attys.

UNITED STATES PATENT OFFICE.

GEO. G. KNIFFIN, OF LONG ISLAND CITY, NEW YORK.

IMPROVED SAD-IRON.

Specification forming part of Letters Patent No. 54,174, dated April 24, 1866.

*To all whom it may concern:*

Be it known that I, G. G. KNIFFIN, of Long Island City, in the county of Queens and State of New York, have invented a new and Improved Sad-Iron; and I do hereby declare that the following is a full, clear, and exact description thereof, which will enable others skilled in the art to make and use the same, reference being had to the accompanying drawings, forming part of this specification, in which—

Figure 1 represents a longitudinal section of this invention. Fig. 2 is a plan or top view of the body of the iron. Fig. 3 is an inverted plan of the handle detached.

Similar letters of reference indicate like parts.

This invention relates to a removable handle for sad-irons, which is provided with dovetailed flanges to fit into correspondingly-dovetailed sockets on the top of the iron, in combination with a drop-catch which passes down through one of the flanges and drops automatically into a socket in the iron as soon as the handle has arrived in the proper position, in such a manner that a handle is obtained which can be readily taken off from or attached to an iron, and which can be used for a number of irons with the greatest ease and convenience.

A represents a sad-iron of any desirable form or shape, and provided on its top surface with two dovetailed sockets, $a$, which are intended to receive and retain the handle B. This handle is secured between two standards, $b$, which are provided with dovetailed flanges $c$ to fit into the sockets $a$ of the iron and a guard, C, fastened between said standards below the handle, serves to prevent the heat of the iron from coming in direct contact with the hand which grasps the handle; and, furthermore, said guard also serves as a brace to strengthen the standards.

D is a drop-catch, which is situated close on the inner surface of one of the standards $b$. It is guided in its up-and-down motion by a suitable socket, $c$, in the handle, and by another socket in the guard and standard, and it is provided with a nose, $f$, in a convenient position for raising it whenever it may be desirable.

When the handle is introduced into the sockets of the iron, and as soon as it has arrived in the desired position, the catch D drops down spontaneously into a socket, $g$, in the iron and retains the handle in its sockets. A suitable spring, $h$, may be applied to depress the catch with the requisite force and to prevent it from rising accidentally.

If it is desired to remove the handle, the catch is raised by a slight pressure of the finger under the nose $f$, and the handle, being thus released, can readily be withdrawn from the dovetail sockets in the iron and introduced into another iron; and if the handle is made of wood or some other bad conductor of heat, it does not become intolerably hot, and it can be used without interruption for a large number of irons.

My handle is cheap, easily adjusted, and not liable to get out of order, and it will prove to be of great convenience for housekeepers, laundresses, and other persons who have to handle sad-irons.

What I claim as new, and desire to secure by Letters Patent, is—

The dovetailed flanges $c$ on the standards of the handle B, to fit into correspondingly-dovetailed sockets $a$ on the sad-iron, in combination with a drop-catch, D, all constructed and operating substantially as and for the purpose described.

GEO. G. KNIFFIN.

Witnesses:
M. M. LIVINGSTON,
ALEX. F. ROBERTS.